(12) United States Patent
Dankewich

(10) Patent No.: US 8,210,953 B1
(45) Date of Patent: Jul. 3, 2012

(54) TRANSLUCENT CLOSED-MOLDED FIBER-REINFORCED PLASTIC AND METHOD OF MAKING THE SAME

(75) Inventor: Michael Dankewich, Kelowna (CA)

(73) Assignee: Whitewater Composites Ltd., Kelowna, BC (CA)

(*) Notice: Subject to any disclaimer, the term of this patent is extended or adjusted under 35 U.S.C. 154(b) by 299 days.

(21) Appl. No.: 12/590,800

(22) Filed: Nov. 12, 2009

Related U.S. Application Data

(60) Provisional application No. 61/199,119, filed on Nov. 12, 2008.

(51) Int. Cl.
  *A63G 21/18* (2006.01)
  *A63G 21/00* (2006.01)
(52) U.S. Cl. .................................. 472/117; 472/116
(58) Field of Classification Search .............. 472/13, 472/116, 117, 128, 88–92; 264/239, 240, 264/241
See application file for complete search history.

(56) References Cited

U.S. PATENT DOCUMENTS

| | | |
|---|---|---|
| 3,607,530 A | 9/1971 | Carpenter |
| 4,112,921 A | 9/1978 | MacCracken |
| 4,117,638 A | 10/1978 | Kidd, Jr. |
| 4,764,707 A | 8/1988 | Cheng Wei |
| 4,796,404 A | 1/1989 | Butler |
| 5,145,089 A | 9/1992 | Chang |
| 5,336,354 A | 8/1994 | Looi |
| 5,539,936 A | 7/1996 | Thomas |
| 5,545,446 A | 8/1996 | Looi |
| 5,615,508 A | 4/1997 | Miller |
| 6,375,578 B1 * | 4/2002 | Briggs .......................... 472/117 |
| 6,667,089 B1 | 12/2003 | Barker |
| 6,863,973 B2 * | 3/2005 | Tomokuni et al. ............ 428/323 |
| 6,889,938 B1 | 5/2005 | Nordman |

(Continued)

FOREIGN PATENT DOCUMENTS

EP  0 416 660 A2  3/1991

(Continued)

OTHER PUBLICATIONS

"Kemlite® Translucent Fiberglass Roof Panel for Van Bodies," Technical Data Sheet 6293, Kemlite® Transportation Products, Jul. 2006, 2 pages.

*Primary Examiner* — Kien Nguyen
(74) *Attorney, Agent, or Firm* — Greenberg Traurig LLP; J. Rick Tache

(57) ABSTRACT

The present disclosure provides a method of fabricating closed-molded translucent fiber-reinforced plastic (FRP) material and parts for use in various applications, such as for use in waterslides and architectural fascia and signage. The method includes: (a) providing a first mold half mateable with a second mold half to define a mold having an internal cavity; (b) disposing a glass fiber pre-form within the internal cavity of the mold, the glass fibers of the pre-form having a preselected refractive index; (c) selecting a transparent thermoset resin having a refractive index when cured that is substantially similar to the refractive index of the glass fibers of the pre-form; (d) injecting the thermoset resin into the internal cavity of the mold until the void space defined within the internal cavity is substantially filled with the resin; (e) allowing the resin to cure; and (f) removing the part from the mold.

16 Claims, 14 Drawing Sheets
(11 of 14 Drawing Sheet(s) Filed in Color)

U.S. PATENT DOCUMENTS

| | | |
|---|---|---|
| 6,905,634 B2 | 6/2005 | Burnell-Jones |
| 6,933,908 B1 | 8/2005 | Mirabueno |
| 7,028,950 B2 | 4/2006 | Salmon |
| 7,134,254 B1 | 11/2006 | Van Gelder |
| 7,300,693 B2 | 11/2007 | Albers |
| 7,854,662 B2 * | 12/2010 | Braun et al. .......... 472/117 |

FOREIGN PATENT DOCUMENTS

| | | |
|---|---|---|
| WO | 02/22346 A2 | 3/2002 |
| WO | 02/31053 A2 | 4/2002 |

* cited by examiner

8PT CAN YOU READ THIS?

10PT CAN YOU READ THIS?

12PT CAN YOU READ THIS?

14PT CAN YOU READ THIS?

16PT CAN YOU READ THIS?

*Fig. 12B.*

TRANSLUCENT CLOSED-MOLDED FIBER-REINFORCED PLASTIC AND METHOD OF MAKING THE SAME

CROSS-REFERENCE TO RELATED APPLICATION

This application claims the benefit of U.S. Provisional Patent Application No. 61/199,119, filed on Nov. 12, 2008, the disclosure of which is hereby expressly incorporated herein by reference.

FIELD OF TECHNOLOGY

The present disclosure relates to translucent, closed-molded fiber-reinforced plastic (FRP), and parts made thereof for various applications, including waterslides and architectural fascia and signage applications.

BACKGROUND

Fiber-reinforced plastic (FRP) is a composite material comprising a thermoset plastic reinforced with glass or other fibers. Such material is also referred to by other names, including fiberglass, glass-reinforced plastic (GRP), reinforced-thermoset plastic (RTP) and reinforced thermoset resin (RTR). These materials will be herein after collectively referred to as "FRP" for ease of description.

Various methods can be used to fabricate FRP parts. Open-mold processes are the most commonly used methods. In open-mold processes a one-sided mold is used. The mold can be made of various well-known materials including, for example, tooling grade FRP, epoxy or metal. Typically, a release agent is first applied to the mold, followed by a layer of gelcoat. The gelcoat is typically a clear or pigmented resin, and gives the finished surface of the part a harder, more durable and attractive, glossy finish.

Open-mold fabrication may typically be done using either a hand lay-up or spray-up process. In a hand lay-up open-mold process, after the gelcoat layer is dry, a layer of glass fiber pre-form (also known as a mat or veil) is laid on the gelcoat layer and wetted with catalyzed resin. Additional layers of glass fiber pre-form are added and wetted with resin until the desired thickness is achieved.

A spray-up open-mold process is much faster and less labor-intensive than a hand lay-up open-mold process. In a spray-up process, chopped glass fibers and catalyzed resin are sprayed directly onto the mold after application of the gelcoat. The resin and glass can be applied separately or can be simultaneously "chopped" in a combined stream from a chopper gun. In both a spray-up and hand lay-up processes, once the desired thickness is achieved, the part is cured, cooled and removed from the mold. With spray-up, the resulting parts have a thickness that tends to be less consistent throughout the part than with hand lay-up.

Open-mold spray-up processes are suitable for high volume part production. However, with open-mold processes, the side of the part that was in contact with the mold has a smooth surface, whereas the other side has a much rougher surface, typically showing a distinct three-dimensional random fiber pattern. A blue-tinted, translucent FRP part (a flume segment of a waterslide) formed using an open-mold, spray-up process is shown in the photographs in FIGS. 1A and 1B. As can be seen in the photographs in FIGS. 1A and 1B, the FRP parts include a textured exterior surface.

For applications which require a smooth or predefined surface finish on both sides and/or close dimensional tolerances, a closed-mold process is more suitable. A photograph of an opaque, blue-colored FRP part (a flume segment of a waterslide) formed using a standard closed-mold process is shown in FIG. 1C. Resin transfer molding (RTM) is a closed-mold process where a glass fiber pre-form is placed in a two-part closed-mold, which is then injected with a catalyzed thermoset resin. As in the open-mold processes described above, a release agent and optionally a clear or pigmented gelcoat layer are first applied to the inside surfaces of the mold. The resin is allowed to cure and then the mold is opened and the part is removed. Typically the resin is injected under pressure. The resin may also be heated, for example, to help control resin cure times for achieving consistent production rates and/or to lower the viscosity of the resin for better flow. The mold is also sometimes preheated, for example, to achieve shorter cycle times.

Light RTM (LRTM) is a vacuum-assisted RTM low-pressure resin injection technique that also uses a two-part mold comprising a mold and a counter-mold, or a first mold portion and a second mold portion. A vacuum is used for mold closure and to assist resin flow through the glass fiber pre-form which is placed inside the mold. A low pressure pump is used to inject the resin which is then drawn through the mold cavity by a vacuum, limiting the pressure needed for injecting the resin. Because limited pressure is used, LRTM molds tend to be less heavy-duty and costly to produce. In LRTM the counter mold is typically semi-rigid, and because it is relatively lightweight, it is easy to handle.

Although the tooling costs can be significantly less for LRTM in comparison to conventional RTM, the part production rate is generally lower. This is because in LRTM, the resin flow rates cannot be speeded up above a certain level in order to fill the mold more quickly. The mold construction and the atmospheric mold clamping pressures limit the overall in-mold pressures that can be applied, for example, typically to less than 0.5 bar (8 psi).

Closed-mold fabrication through conventional RTM is suitable for high volume manufacturing of FRP parts. Light RTM is now the most commonly used closed-mold process for low to medium volume applications, such as marine, automotive, industrial, wind, power, and medical composite molding applications.

Closed-mold fabrication of FRP parts through conventional RTM or LRTM offers a number of advantages over open-mold spray-up fabrication, including some or all of the following:

Closed-molded parts can be produced with a smooth or deliberately textured, (gelcoated or non-gelcoated) engineered surface on both sides. This is practically important for some applications, and also provides an improved visual appearance and a better looking product.

Closed-mold processes result in reduced material waste and are a more environmentally-friendly process, as they produce less styrene and other volatile organic compound (VOC) emissions. This improves the working environment, reduces or eliminates the need for ventilation systems, and enhances regulatory compliance.

Closed-mold processes allow for superior design flexibility to create complex shapes and forms.

Closed-mold processes provide more uniform dimensional tolerance. The parts typically have tighter tolerances to design specifications (for example, +/−1.0 mm or 0.04 inches) and greater consistency in part thickness.

Parts produced via closed-mold processes can have high fiber content, which creates a strong and light-weight finished product. For example, the fiber content of closed-molded parts is typically in the range of 25% to 50% fiber content by volume. Parts formed from open-mold processes, by comparison, have glass fiber content by volume typically in the range of 15-35%, with spray-up at the lower end and hand lay-up at the higher end. LRTM closed-mold processes have short mold-cycle times that can help increase production volumes and through-put.

It is well known that adding glass fibers to transparent or clear plastic resin improves the stiffness and strength of the material. However, this improvement generally goes hand in hand with diminished optical properties of the FRP part. The term "optical properties" refers to the ability of the material to transmit visible light. Materials can be "transparent", in which case they will transmit visible light without significant scattering such that items lying beyond are clearly visible. Materials can also be "opaque", in which case visible light will be blocked and one cannot see through an object made from those materials. In between are materials that transmit some visible light, such that items lying beyond can be seen, but perhaps not perfectly clearly or at a distance. Such materials are referred to a "translucent". The degree of translucency a material can provide will often be a function of the thickness of a part made from that material.

Until now, FRP panels have not been produced with sufficient translucency and optical quality for certain applications, such as for use in architectural fascia and waterslide applications. Most closed-molded and open-molded FRP parts are opaque, and are made in a variety of colors. To create opaque FRP parts, typically only the surface gelcoat layer is colored, or the parts are instead sanded and then painted with the desired color after being made.

There have been attempts to make translucent FRP parts via open-mold processes for various applications including waterslides, roof and wall panels, skylights, and tanks or vessels (where the translucency enables vision of the liquid level inside). Translucent FRP samples fabricated using a conventional open-mold process are shown in the photograph of FIG. 2. Although the translucent open-molded FRP samples similar to those in shown in FIG. 2 could be made using suitable variations of a conventional open-mold FRP process using readily available materials, the method and materials used to create the FRP samples of FIG. 2 will be hereinafter described for reference in the discussion below.

FIG. 3 illustrates a cross-sectional view of a portion of an open-molded translucent FRP sample 18 of FIG. 2. The sample 18 includes a clear gelcoat layer 20 (about 0.5 mm, or 0.02 inches thick) and an FRP layer 24 (about 3.5 mm, or 0.14 inches thick). The FRP layer 24 was formed using a conventional open-mold hand lay-up process using three layers of an FRP supply E-Glass chopped strand/fiber pre-form available from Ashland Inc. of Columbus, Ohio. The Ashland FRP supply E-Glass chopped strand/fiber pre-form exhibits at least the following known characteristics:

It has randomly oriented chopped glass fibers

It has a 1.5 oz. per square yard (per 0.84 square meter) fiber content mat

The glass fibers have a diameter of about 13 micron

The fibers have a silane-based coating that is styrene soluble (for bonding the fibers to the resin)

The "E-Glass" grade glass fibers are suitable as an electrical insulator

It should be appreciated that other suitable glass chopped fiber pre-forms having similar characteristics may instead be used.

The resin used to create the FRP layer 24 has certain characteristics to enhance the translucency of the FRP layer 24. In the sample 18 of FIG. 2, a surf board resin available from Reichhold of Research Triangle Park, North Carolina was used. The resin is known to exhibit at least the following characteristics:

It is a thermoset polyester resin

It cures to a colorless, transparent plastic

The cured refractive index of the resin is between about 1.55 and 1.57

The viscosity of the resin is between about 400-500 CPS at 77° F.

It has a thix index of about 5.0 (wherein the thix index is a measure of anti-sag properties)

It should be appreciated that the resin may be altered to accommodate the end-use requirements of the open-molded translucent FRP part. For example, the resin may be modified using well-known techniques to increase water resistance, temperature resistance, and/or UV stability. In some cases the translucent material is tinted, in which case a pigment is incorporated into the resin so that the material is tinted throughout its thickness.

The translucent FRP open-molded samples fabricated as described had about 33% fiber content by weight, and the material is therefore sufficiently strong for a variety of applications, including waterslides and architectural fascia and signage applications. However, as can be seen in the photograph of FIG. 2 and as will be more fully appreciated by the description below, although the materials formed using an open-mold hand lay-up process have very little color, these materials have a low degree of translucency. This is due at least in part to the rough surface created on the unfinished surface of the material (which also causes varied thickness throughout a part or sample made from the material), and a visible fiber pattern within the FRP layer 24. The low degree of translucency results in a low degree of light transmission and optical quality that makes open-molded translucent FRP materials, like the samples shown in FIG. 2, insufficient for some applications.

Attempts to make closed-molded translucent FRP parts have likewise been unsuccessful. More specifically, FRP samples with low translucency fabricated using a conventional RTM or LRTM closed-mold process are shown in FIG. 4. Although the low-translucency closed-molded FRP samples similar to those shown in FIG. 4 could be made using variations of conventional closed-mold RTM or LRTM processes using readily available materials, the method and materials used to create the FRP samples of FIG. 4 will be hereinafter described for reference in the discussion below.

FIG. 5 illustrates a cross-sectional view of a portion of a closed-molded FRP sample 26 of FIG. 4. The sample 26 includes inner and outer clear gelcoat layers 28 and 32 (each about 0.5 mm, or 0.02 inches thick), inner and outer FRP layers 36 and 40 (each about 1 mm, or 0.04 inches thick), and a flow media layer 44 (about 1 mm, or 0.04 inches thick) interposed between the FRP layers 36 and 40 consisting of 180 g/m$^2$ polypropylene. The FRP layer 36 and 40 and flow media layer 44 were formed using a conventional closed-mold process using a Rovicore® 600/D3/600 fiber glass pre-form that consists of large diameter glass fibers mechanically stitched together with flow media (as is well known in the art) for helping the resin flow through the mold when vacuum is applied. The pre-form was infused with a resin used to create the FRP layers 36 and 40 having certain characteristics to enhance the translucency of the FRP layers 36 and 40. In the sample of FIG. 4, an Ashland Aropol CL 70502-25 clear ISO resin was used, which is known to exhibit at least the following characteristics:

It is a thermoset isophthalic polyester resin

It cures to a colorless, transparent plastic

The viscosity of the resin is between about 90-120 CPS at 77° F.,

The FRP closed-molded samples fabricated as described above with reference to FIGS. 4 and 5 have about 32% fiber content by weight, and the material is therefore sufficiently strong for a variety of applications, including waterslides and architectural fascia and signage applications. However, as can be seen in FIG. 4 and as will be more fully appreciated by the description below, these translucent closed-molded FRP materials have a degree of translucency that is considerably less than would be desirable for many situations. The low degree of translucency is due at least in part to visibility of the glass fibers within the material after the resin has cured.

Where transparent or highly translucent plastics are needed, typically acrylic, polycarbonate and other thermoplastics have been used. However, these materials do not have the same strength and durability as FRP. Also, parts made from acrylic and polycarbonates (or other similar materials) generally have a much larger coefficient of thermal expansion which can be problematic in some applications. These materials also tend to pose limitations in part geometry due to limited draw depth, which causes problems in thickness control, as the material is often "stretched" over corners and mold features.

Translucent FRP parts are desirable in many applications, which include, for instance, waterslides or architectural signage or fascia. Waterslides are popular ride attractions for water parks, theme parks, family entertainment centers and destination resorts. The popularity of waterslide rides has increased dramatically over the years, and park patrons continue to seek out more exciting and stimulating ride experiences. Thus, there is an ever present demand for different and more exciting waterslide designs that offer riders a unique ride experience and that give park owners the ability to draw larger crowds to their parks.

Transparent waterslides have been fabricated using clear or color-tinted acrylic flume segments. This can provide an entertaining and exciting waterslide experience, allowing waterslide users to seek out and experience thrilling sensations such as flying, as well as allowing other patrons to have a pleasing and exciting view of riders as they descend. Sometimes transparent sections of the waterslide pass through underwater features such as shark tanks or aquariums so that the user has the feeling of being inside that feature. It can also allow the slide structure to blend more with the surroundings and have a more subtle visual impact.

FRP is generally a preferred material for waterslide construction over acrylic or other thermoplastics. Acrylic slides are often cost prohibitive and, as noted above, lack the strength and durability of FRP products. As also noted above, FRP has better structural properties and therefore thinner and lighter weight parts can be used. Furthermore, FRP does not have the same limitations in thickness control as acrylic or other thermoplastics, which provides greater design flexibility for unique waterslide parts.

Translucent waterslide flume segments have been fabricated using open-molded spray-up FRP materials such as those described above in reference to FIGS. 1A and 1B as well as FIGS. 2 and 3. As can be seen in FIGS. 1A and 1B and 2, the open-mold spray-up FRP process creates parts having a low degree of light transmission and translucency.

For plastic signage and architectural fascia applications, thermal-formed acrylic or other thermoplastic panels are commonly used. As noted above, FRP offers numerous advantages (ability to be formed into more complex shapes, strength, light-weight properties, less thermal expansion issues) that are also advantageous in architectural fascia and signage applications. Because FRP is stronger, panels that would have to be made and installed in several pieces in acrylic can be made in a single large panel. Moreover, translucent FRP materials could be used to create architectural fascia panels and signage with lenses and shaded light transmission features such as up-lighting or wash, and can be used to produce backlit graphics using post-applied or integral graphics or decals.

Thus, it can be appreciated from the foregoing that it is desirable to develop an improved translucent FRP material that can be used to create parts for various applications, such as for waterslides and architectural fascia and signage, as well as a method of fabricating the improved translucent FRP material and parts.

SUMMARY

The present disclosure provides a method of fabricating closed-molded translucent fiber-reinforced plastic (FRP) material and parts for use in various applications, such as for use in waterslides and architectural fascia and signage. The method includes: (a) providing a first mold half mateable with a second mold half to define a mold having an internal cavity; (b) disposing a glass fiber pre-form within the internal cavity of the mold, the glass fibers of the pre-form having a preselected refractive index; (c) selecting a transparent thermoset resin having a refractive index when cured that is substantially similar to the refractive index of the glass fibers of the pre-form; (d) injecting the thermoset resin into the internal cavity of the mold until the void space defined within the internal cavity is substantially filled with the resin; (e) allowing the resin to cure; and (f) removing the part from the mold.

The present disclosure further discloses a closed-molded translucent FRP material that may be, for example, in the form of a waterslide flume segment or architectural fascia and signage. The closed-molded translucent FRP material and parts include first and second layers of a cured substantially clear gelcoat and an FRP layer formed between the first and second layers of gelcoat. The FRP layer includes a glass fiber pre-form comprising glass fibers having a preselected refractive index, and a cured transparent resin bonded to the glass fibers of the pre-form, wherein the cured resin has a refractive index when cured that is substantially similar to the refractive index of the glass fibers of the pre-form.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of the present disclosure will become more readily appreciated by reference to the following detailed description, when taken in conjunction with the accompanying drawings, wherein:

FIG. 12B is planar view of a sheet have text printed thereon in a standard font of increasing size, the sheet for use with the test fixture of FIG. 12A;

DETAILED DESCRIPTION

Figure 6:
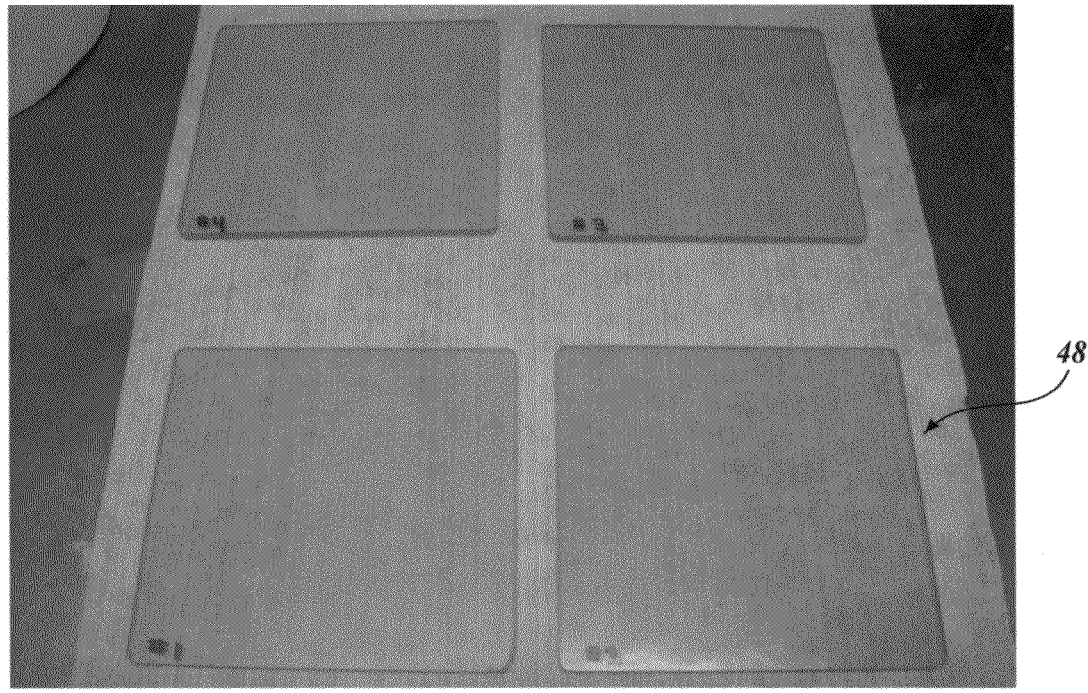
FIG. 6 is a photograph of translucent, closed-molded FRP samples formed in accordance with a preferred embodiment of the present disclosure.
Figure 7:
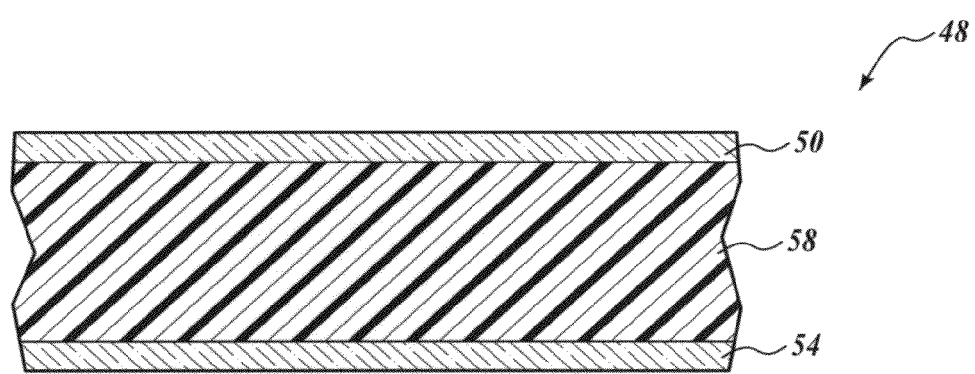
FIG. 7 is an illustrated cross-sectional view of a portion of one of the samples of FIG. 6.

Referring to FIG. 6, a plurality of samples of an improved RTM closed-molded translucent FRP material formed in accordance with a preferred embodiment of the present disclosure is depicted. The overall general process for fabricating the improved translucent closed-molded FRP samples shown in FIG. 6 will first be described. FIG. 7 depicts a cross-sectional view of a portion of a translucent closed-molded RTM FRP sample 48 of FIG. 6. The translucent closed-molded RTM FRP sample 48 includes inner and outer clear gelcoat layers 50 and 54 (each about 0.5 mm, or 0.02 inches thick) and an FRP layer 58 (about 3 mm, or 0.12 inches thick) formed between the gelcoat layers 50 and 54.

The FRP layer 58 is formed using a closed-mold RTM process in which a glass fiber pre-form is placed in a mold (after the clear gelcoat layers have cured), which is then closed and injected with a catalyzed resin. The resin can be drawn through the glass fiber pre-form by applying a vacuum in a light RTM process. Alternatively, the resin may be injected under pressure in a regular RTM process.

The glass fiber pre-form and the resin are selected so that the glass fiber in the pre-form becomes almost or entirely visually absent when incorporated into the cured resin. It is believed by the inventors that closely matching the refractive indices of the cured resin and the glass fibers of the glass fiber pre-form reduces the visibility of the glass fibers in the finished product and improves its translucency. It is also been found that it is beneficial if the glass fiber pre-form does not include flow media, binders, or stitching and consists of glass fibers with a small filament size.

The resin is chosen so that it is optically transparent when cured, and it is of suitable viscosity for injection. The resin can include one or more additives, for example, catalysts, coupling or cross-linking agents, UV-blockers, pigments or dyes, anti-oxidizing agents, weathering agents, and/or air release or surface tension reducers which can reduce the tendency for air bubbles to be trapped in the finished product. Preferably the additives do not unduly adversely affect the optical characteristics, moldability or physical properties of the material. The glass fiber content of the finished part is preferably in the range of 35-50% by weight.

Although the translucent closed-molded FRP sample 48 shown in FIG. 6 may be formed using materials having the same or similar properties as described above, a specific example of the formulation of a closed-molded RTM translucent FRP sample 48 having desirable optical and light transmission properties will be hereinafter provided.

EXAMPLE

The closed-molded RTM translucent FRP samples shown in FIG. 6 were fabricated using one layer of a Uniconform® UM2A glass fiber pre-form available from Owens Corning of Toledo, Ohio. The Uniconform® UM2A glass fiber pre-form exhibits at least the following known properties:

It has randomly oriented continuous E-glass fibers

The glass fibers have a maximum diameter of about 18 micron

It has a filament bundle size of 25 tex at the surface, 50 tex in the core (wherein "tex" is a measure of the fiber bundle size, and is defined by the weight (in grams) of 1 kilometer of fiber bundle, wherein a fiber bundle is simply a grouping of individual glass fibers)

The pre-form has no stitching or binder materials, but rather, the glass strands are held together by a suitable method such as needle punching The fibers have a silane-based coating that is styrene soluble (for bonding the fibers to the resin)

The glass fibers have a refractive index of 1.56+/−0.02

The pre-form has a substantially uniform fiber distribution per unit area

The resin chosen to create the closed-molded RTM translucent FRP samples shown in FIG. 6 was an Ashland Aropol CL 70502-25 clear ISO resin. The chosen resin is known to exhibit at least the following characteristics:

It is a thermoset isophthalic polyester resin

It cures to a colorless, transparent plastic

The cured refractive index of the resin is between about 1.55 and 1.57

The viscosity of the resin is between about 90-120 CPS at 77° F.

The resin may further include some methyl methacrylate (MMA), to suitably adjust the viscosity. It should be appreciated that the resin could be further altered in formulation to accommodate end-use requirements. For example, the resin may be modified using well-known techniques to increase water resistance, temperature resistance, and/or UV stability.

It has also been discovered that closed-molded RTM translucent FRP parts that are substantially uniform in thickness have increased levels of translucency. Parts that are uneven in thickness may result from increased or decreased amounts of glass fibers in certain areas which cause the resin to deform when curing. To adjust the thickness in areas of the closed-molded RTM translucent FRP part, the amount of glass fibers can be increased or decreased to create a part of substantially uniform fiber content. This can be done by taking a cross-section of a finished closed-molded RTM translucent FRP part, measuring the fiber content in different areas of the part (especially comparing fiber content in areas of varying thickness), and increasing or decreasing the amount of glass fibers in those areas accordingly.

The closed-molded RTM translucent FRP samples formed using the above-described method and materials had about 30% fiber content by weight, and the material is therefore sufficiently strong for a variety of applications. Moreover, as can be seen in the photograph of FIG. 6, and as will be more fully appreciated by the experiments discussed below, these materials have a high degree of translucency that results in an FRP material having superior level of light transmission and optical quality.

The closed-molded RTM translucent FRP material has been found to be particularly suitable for waterslides and architectural fascia and signage. In a waterslide application, a glass fiber pre-form (OCV Uniconform UM2A 1800 from Owens Corning was injected with a clear polyester resin (Ashland Aropol CL 70502-25 clear ISO resin) in a light RTM production process using a vinyl ester matched mold set. Initially, both halves of the mold were coated with a clear gelcoat, and then the glass fiber pre-form was laid on the "A" side (lower half) of the mold. The mold was closed and a vacuum applied (for example, −0.8 bar cavity, −0.9 bar flange). The resin was mixed with an MEKP (methyl ethyl ketone peroxide) initiator at varying ratios depending on the part size and ambient temperature, and was infused under vacuum pressure. The part was then cured (with the cure time varying depending on part size) and the waterslide part was removed from the mold.

Figure 8:
FIG. 8 is a photograph of a translucent, closed-molded FRP architectural fascia panel formed in accordance with a preferred embodiment of the present disclosure.

In a signage or architectural fascia application, closed-molded RTM translucent FRP parts were fabricated using methods similar to the above-described method with respect to waterslide parts. Typically, for architectural parts the resin was injected with a low pump pressure, and was allowed to cure for about 90 minutes. An architectural fascia panel formed in accordance with this method is shown in the photograph of FIG. 8.

For parts that are intended to be substantially colorless, slight resin discoloration or yellowing due to the curing process can be offset by the addition of a slight blue tint to the resin prior to injection so that the material is tinted throughout its thickness. For example, the tint can be a pigment solution in a glycol carrier with the pigment ratio typically varying from about 1% to 3%, depending on the final color requirements. In one example, 2 mL of tint (a 1% pigment solution) per liter of resin was used to produce clear parts.

Figure 9A:
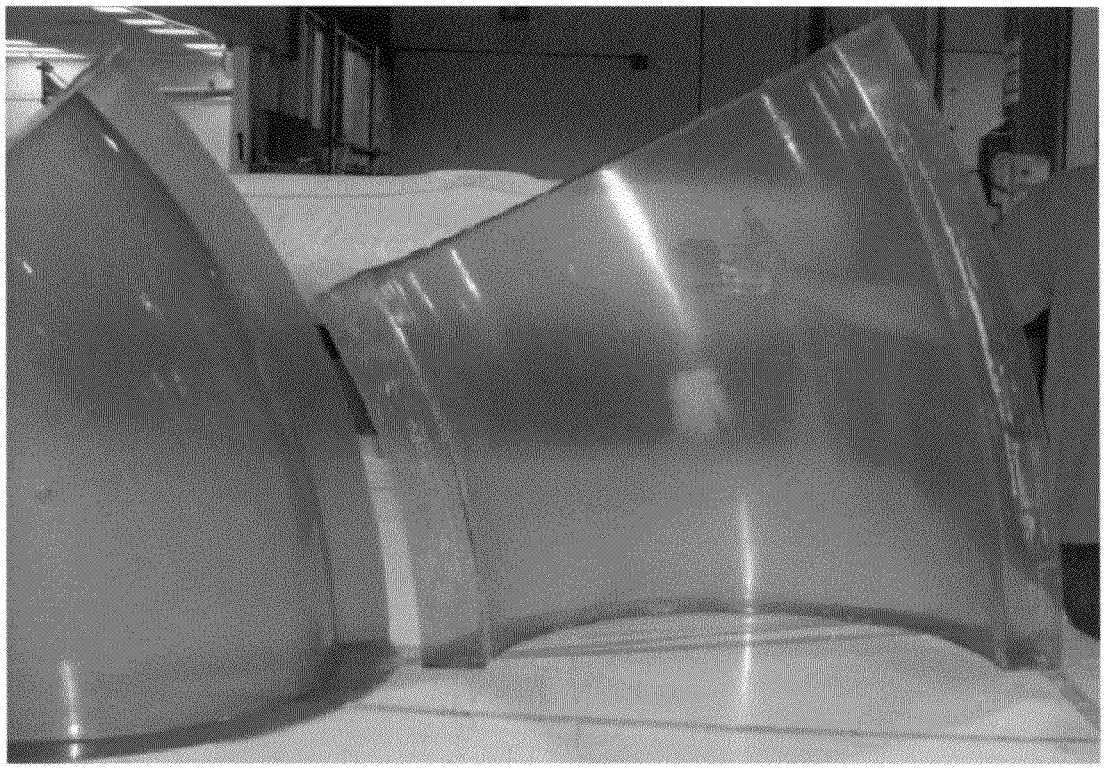
FIGS. 9A and 9B are photographs of translucent, closed-molded FRP waterslide parts formed in accordance with a preferred embodiment of the present disclosure, wherein the waterslide parts are tinted blue.
Figure 9B:
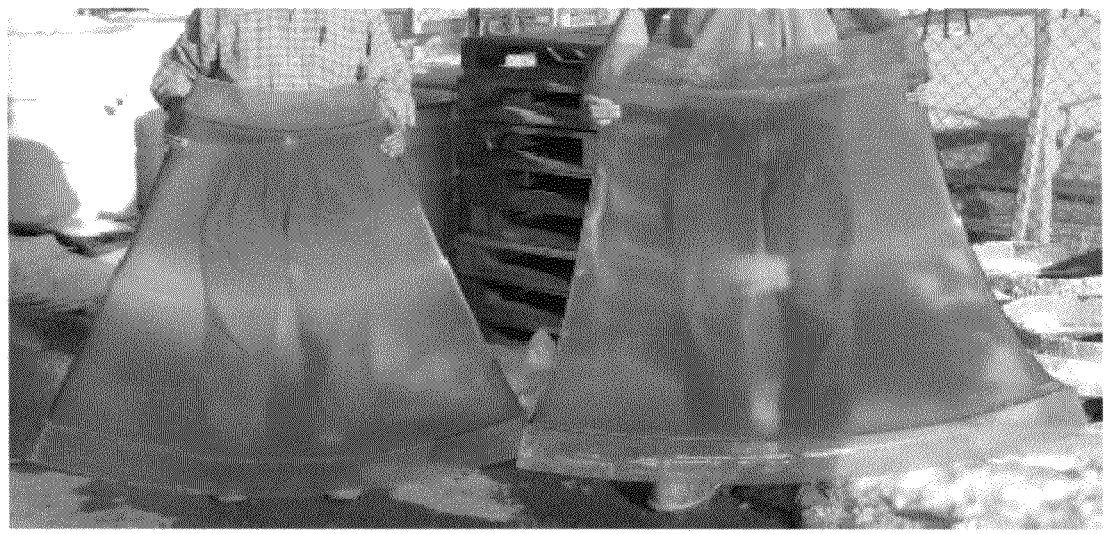

In some cases, it may be desirable to tint the translucent material, in which case one or more pigments can be added to the resin prior to injection. The particle size of the pigment is important, both for the optical characteristics of the finished part and so that, during the fabrication process, the tinted resin flows through the pre-form without clogging (which would otherwise cause unevenness in the color of the finished part). Preferably pigment particle sizes of not more than about 8 microns are used. This typically enables the tint to disperse evenly throughout the part during the resin infusion stage. A portion of a waterslide formed in accordance with the above-described method and having a blue tint is shown in the photographs of FIGS. 9A and 9B.

Combinations of opaque and tinted or clear areas may be combined in one part to provide special visual or graphic effects depending on end-use requirements. Post-applied paints can also be used to obtain unique appearance features when combined with the translucent base material. Thus, it should be appreciated that closed-molded RTM translucent FRP parts formed in accordance with the above-described method can be used in a variety of applications having different structural and aesthetic requirements.

A number of tests and comparative tests were performed to investigate the characteristics and properties of closed-molded RTM translucent FRP materials formed in accordance with the above-described method and materials, and to compare them with FRP materials formed also using substantially transparent resins but in combination with other glass fiber pre-forms and made using other fabrication methods. These test results are included below in EXPERIMENTS 1 and 2. In that regard, EXPERIMENT 1 describes results from a light transmission test performed on samples shown and described with respect to FIGS. 2, 4, and 6. EXPERIMENT 2 describes results from an optical quality test performed on samples shown and described with respect to FIGS. 2, 4, and 6. It will become apparent from the experiments described below that the closed-molded RTM FRP samples of FIG. 6 have superior light transmission and optical quality characteristics, and therefore significantly superior translucency, when compared to the open-molded FRP materials shown and described with respect to FIG. 2 and the closed-molded FRP materials shown and described with respect to FIG. 4.

Experiment 1

Light Transmission

Figure 1A:
FIGS. 1A and 1B are photographs of a prior art open-molded blue-tinted FRP part, specifically a waterslide flume segment.
Figure 1B:
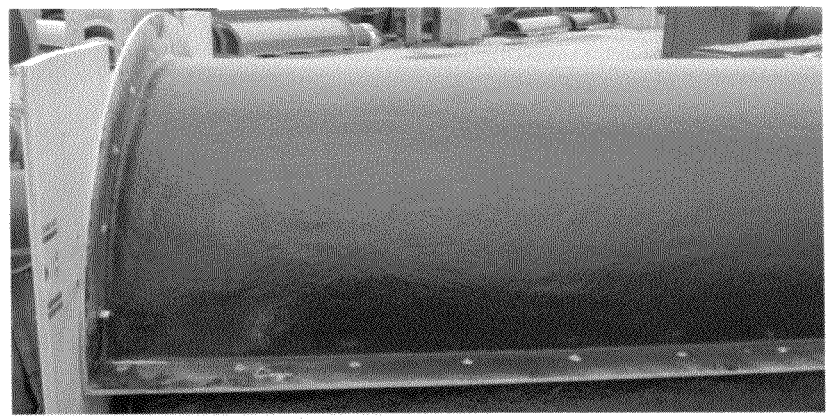
Figure 1C:
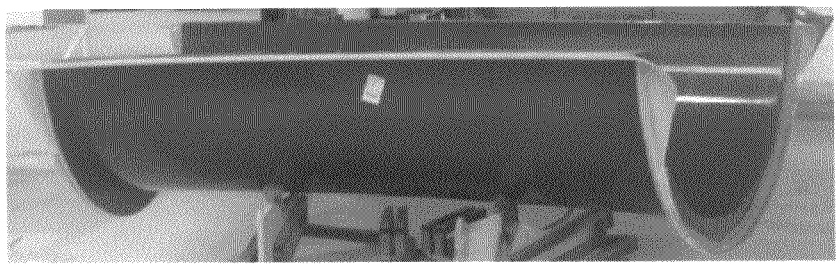
FIG. 1C is a photograph of a prior art closed-molded, opaque, blue-colored FRP part, specifically a waterslide flume segment.
Figure 2:
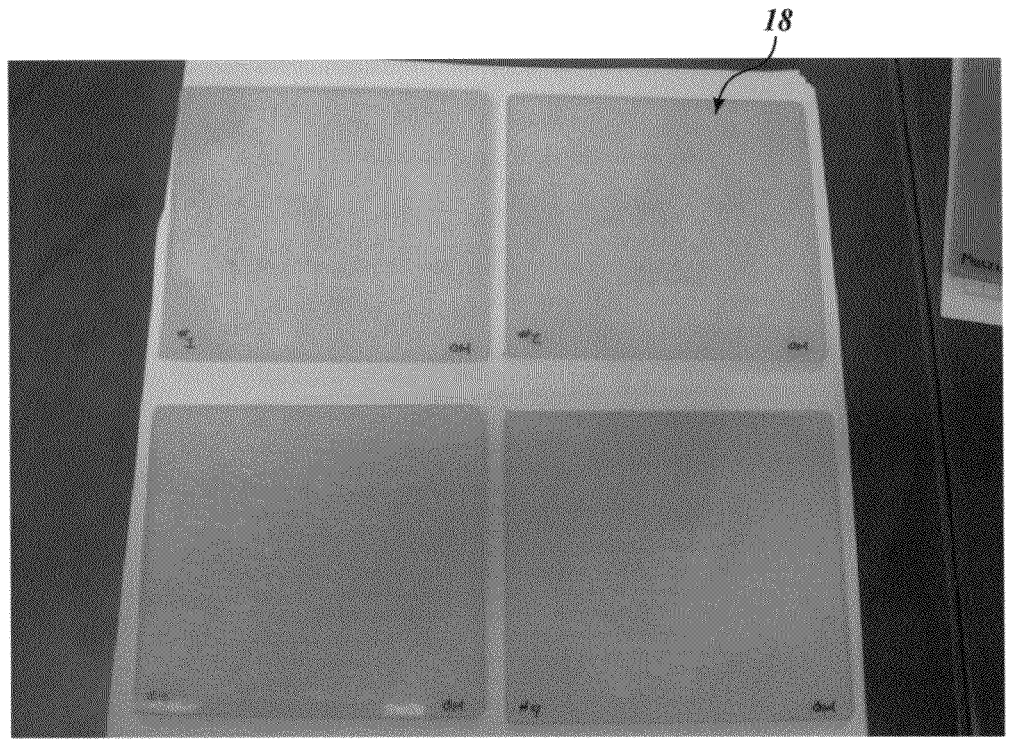
FIG. 2 is a photograph of low-translucency, open-molded FRP samples (prior art)
Figure 3:
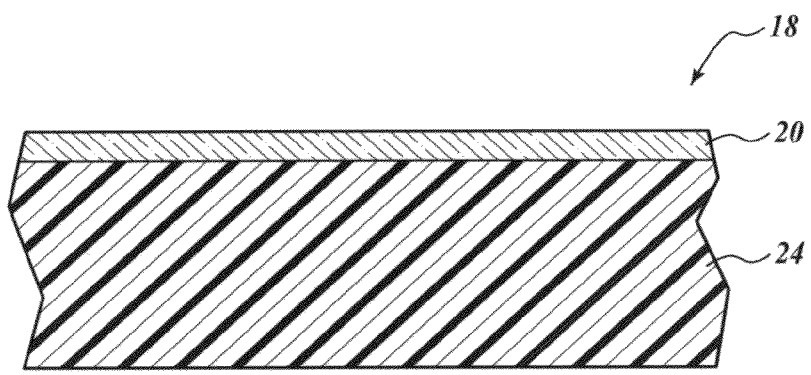
FIG. 3 is an illustrated cross-sectional view of a portion of one of the samples of FIG. 2.
Figure 4:
FIG. 4 is a photograph of low translucency, closed-molded FRP samples.
Figure 5:
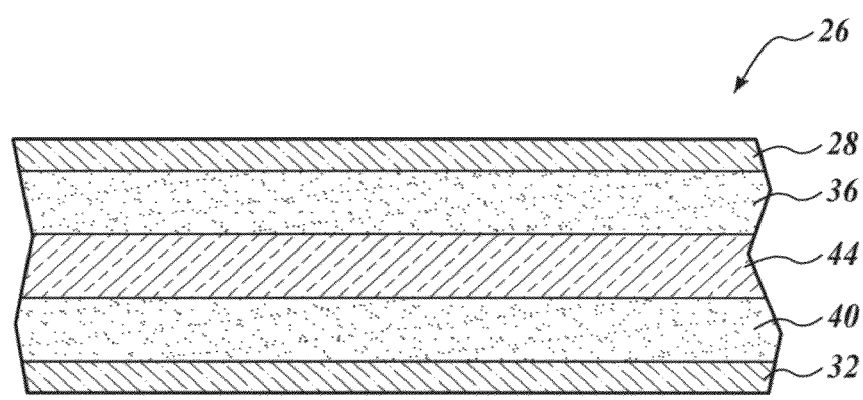
FIG. 5 is an illustrated cross-sectional view of a portion of one of the samples of FIG. 4.
Figure 10:
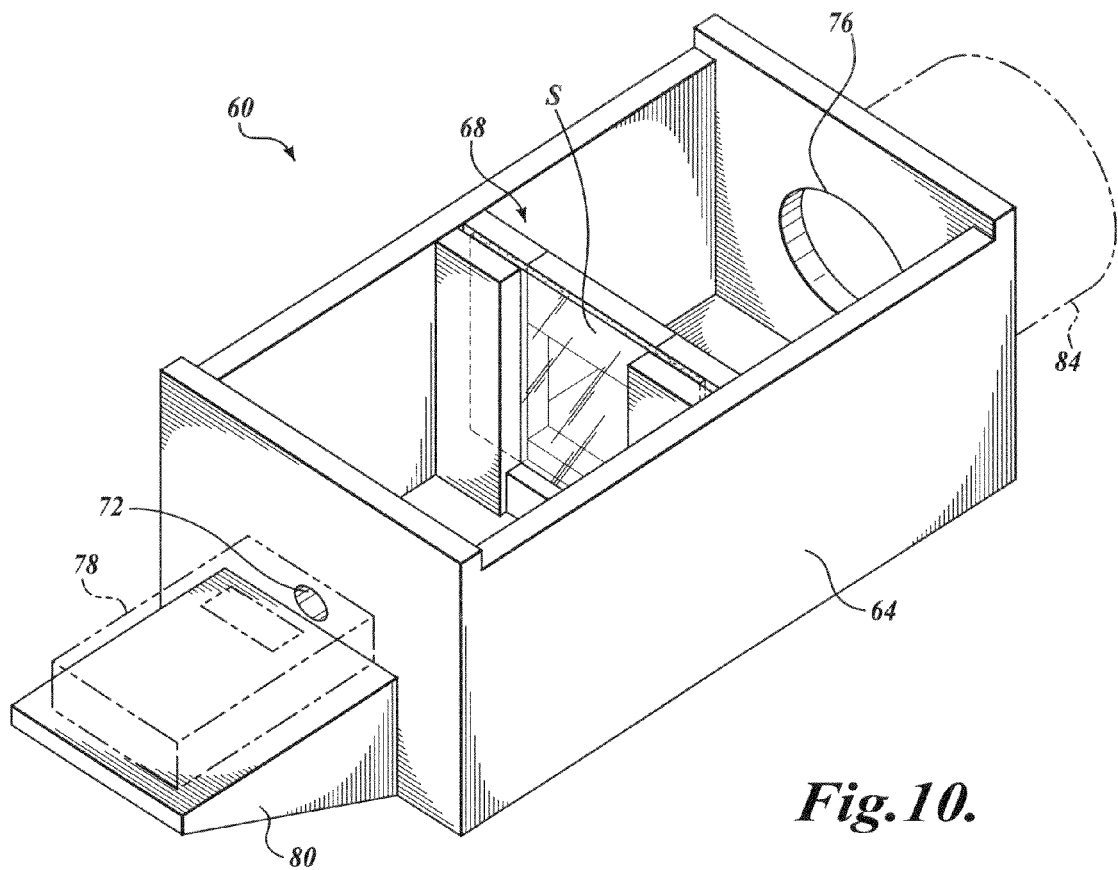
FIG. 10 is an isometric view of a test fixture for use in measuring light transmission of samples of translucent FRP materials.
Figure 11:
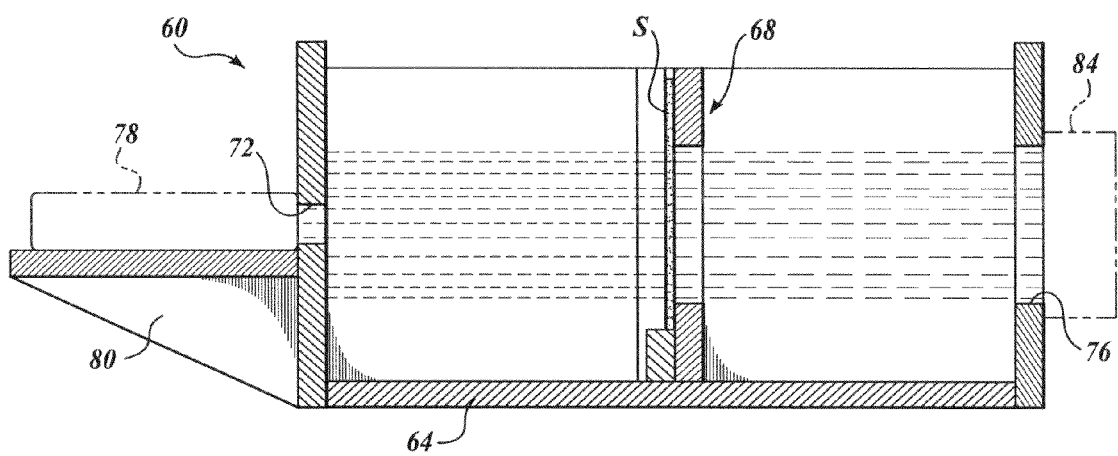
FIG. 11 is a cross-sectional view of the test fixture of FIG. 10; wherein the light transmission through an FRP sample is shown being tested.

The purpose of this experiment was to determine the amount of visible light permitted through FRP samples shown and described with respect to FIGS. 2, 4, and 6, as one indicator of the translucency of the materials. Referring to FIGS. 10 and 11, a test fixture 60 was developed to measure the light permittivity of the samples. The test fixture 60 consisted of a hollow housing 64, preferably rectangular-shaped, having a cover (not shown) to enclose the interior chamber. A slot 68 was defined in the center of the fixture 60 that was suitable for slidably receiving a test sample S therein. The slot 68 received the sample S such that it was substantially parallel to the first and second ends of the housing 64.

A first opening 72 was formed in a first end of the housing 64 that was in substantially coaxial alignment with a second opening 76 formed in the second end of the housing 64. The first opening 72 was sized to receive a light sensor of a visible light transmission and power meter 78 ("VLT meter"). Although other suitable VLT meters may be used, the experiment was conducted with EDTM Model #VP1165. A light meter support 80 was secured to the first end of the housing 64 to support the VLT meter 78 in a substantially horizontal position such that the light sensor of the VLT meter 78 was substantially aligned with the first opening 72.

A light source 84 was aligned with the second opening 76 such that the light from the light source was directed through the opening 76 toward the light sensor of the VLT meter 78. The light source used in this experiment was a common incandescent projector type light bulb, rated at 100W. The fixture 60 held the sample S, the VLT meter 78, and the light source 84 at constant distance and angle relative to one other. For instance, in the experiment conducted, the fixture 60 held the sample S 150.4 mm (5.92 inches) from the light source 84 and 150.4 mm (5.92 inches) from the VLT meter 78.

The samples S used in the experiment were samples of materials formed as described above with respect to FIGS. 2, 4, and 6. Thus, the samples S tested will be hereinafter referred to as a "FIG. 2 sample," a "FIG. 4 sample," and a "FIG. 6 sample." The samples were of substantially the same thickness, size and shape.

To conduct the experiment, the samples S were placed in the slot 68 and light transmission measurements were taken using the VLT meter 78. The VLT meter 78 measured light transmission as a percentage of the light emitted from the light source 84. More specifically, the experiment was conducted by carrying out the following steps:

1) Turning on the light source 84 and VLT meter 78;
2) Placing the cover over the opening in the test fixture housing 64 and calibrating the VLT meter 78 following an established calibration procedure for the VLT meter 78;
3) Removing the cover, placing the first FIG. 2 sample into the slot 68, and replacing the cover;
4) Observing and recording the reading on the VLT meter 78;
5) Removing the cover and removing the first FIG. 2 sample;
6) Replacing the cover and recalibrating the VLT meter 78;
7) Loading the second FIG. 2 sample and replacing the cover;
8) Observing and recording the reading on the light meter;
9) Repeating steps 2 through 8 as desired to test other FIG. 2 samples;
10) Performing steps 2 through 8 on FIG. 4 and FIG. 6 samples.

Data was gathered for each of the samples and is tabulated in TABLE 1 below.

TABLE 1

| Sample | Average Thickness (mm)/(inches) | % Light Transmitted |
|---|---|---|
| FIG. 2 SAMPLE - 1 | 4.0150/0.1581 | 60% |
| FIG. 2 SAMPLE - 2 | 3.9300/0.1547 | 59% |
| FIG. 2 SAMPLE - 3 | 4.2100/0.1657 | 61% |
| FIG. 2 SAMPLE - 4 | 4.0900/0.1610 | 61% |
| FIG. 4 SAMPLE - 1 | 3.1720/0.1249 | 49% |
| FIG. 4 SAMPLE - 2 | 3.2600/0.1283 | 47% |
| FIG. 6 SAMPLE - 1 | 3.7775/0.1487 | 72% |
| FIG. 6 SAMPLE - 2 | 4.2700/0.1681 | 70% |
| FIG. 6 SAMPLE - 3 | 4.1150/0.1620 | 73% |
| FIG. 6 SAMPLE - 4 | 3.9275/0.1546 | 72% |

As can be understood by referring to the results shown in TABLE 1, the FIG. 6 samples transmitted on average 11.5% more light than the FIG. 2 samples, and the FIG. 6 samples transmitted on average 23.75% more light than the FIG. 4 samples. Thus, it can be concluded that the closed-molded RTM translucent FRP materials shown and described with respect to FIG. 6 consistently allow more light to be transmitted because they have a considerably higher level of translucency.

Experiment 2

Optical Quality

The purpose of this experiment is to further characterize and compare the transparency qualities of the materials by determining the ability to read text through samples shown and described with respect to FIGS. 2, 4, and 6. The same nomenclature for the samples (FIG. 2, 4, or 6 samples) will be used as above for EXPERIMENT 1. Moreover, similar to above, the samples used in this experiment were of substantially the same thickness, size and shape.

Figure 12A:
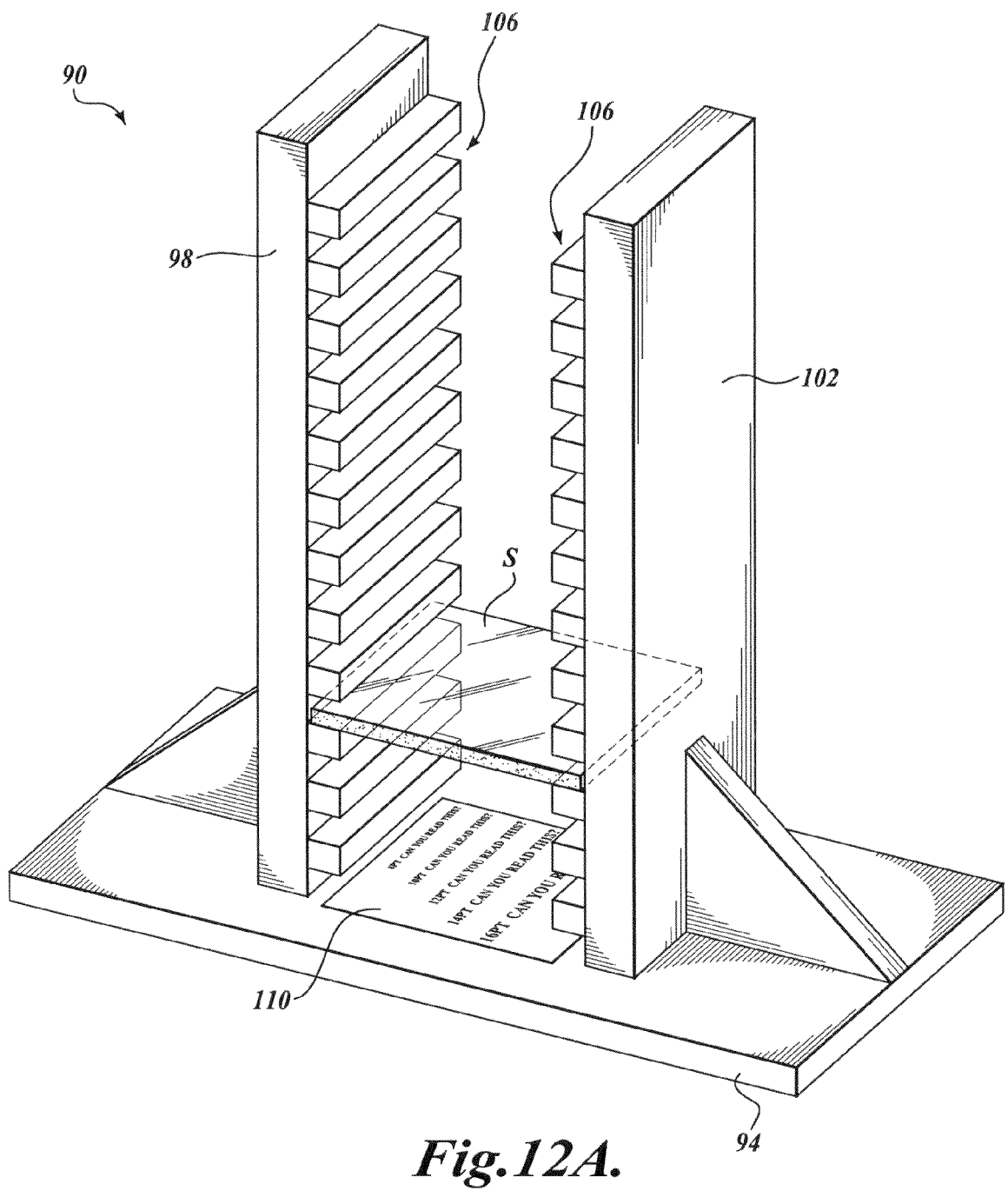
FIG. 12A is an isometric view of a test fixture for use in measuring optical properties of samples of translucent FRP materials.

Referring to FIG. 12A, a graduated height test fixture 90 was developed to measure the optical qualities of the samples. The test fixture 90 consisted of a base 94 having first and second upright supports 98 and 102 extending upwardly therefrom. A plurality of horizontal slots were defined on the upright supports 98 and 102 by a plurality of opposing protrusions 106 extending from the inner opposing surfaces of the upright supports 98 and 102. The protrusions 106 were spaced equidistant from one another to define slots increasing in height at one inch increments along the length of the supports 98 and 102. In the experiment conducted, twelve slots were used at one inch increments. The protrusions 106 defined slots substantially transverse to the upper surface of the base 94 that were configured to slidably receive samples S therein.

Referring additionally to FIG. 12B, a sheet 110 having text printed thereon in a standard font of increasing size was placed on the base 94 such that it was substantially aligned with the sample S when it was received within a slot. The optical quality of the sample S was assessed by placing the sample S at increasing distances (in increments of one inch) away from the sheet 110 to subjectively determine the readability of different sized fonts through the sample S. The printed text on was evaluated at varying distances from the sample S, until the largest text size was not readable. The output of the experiment was to measure the smallest font readable through the sample S, at the greatest distance away from the sample S. The test environment and lighting conditions remained substantially constant throughout the comparative experiment.

More specifically, the experiment was conducted as follows:

1) Placing the sheet 110 in the base 94 of the test fixture 90;
2) Placing the sample S into the lowest slot in the test fixture 90, which effectively placed the sample S directly on the sheet 110;
3) Attempting to read the text on the sheet 110 with your chin resting on the top of the fixture 90;
4) Moving the sample S up to the next graduation in height and attempting to read the text again;
5) Continuing this process, recording at what height text could no longer be read, for each font size;
6) Performing steps 1 through 6 with all of the samples;
7) Recording observations.

Data was gathered for each of the samples and is tabulated in TABLE 2 below.

TABLE 2

| | FIGURE 2 SAMPLE | | | | | FIGURE 4 SAMPLE | | | | | FIGURE 6 SAMPLE | | | | |
|---|---|---|---|---|---|---|---|---|---|---|---|---|---|---|---|
| | Text Font Size | | | | | | | | | | | | | | |
| Sample | 8 pt | 10 pt | 12 pt | 14 pt | 16 pt | 8 pt | 10 pt | 12 pt | 14 pt | 16 pt | 8 pt | 10 pt | 12 pt | 14 pt | 16 pt |
| 0" | Y | Y | Y | Y | Y | N | Y | Y | Y | Y | Y | Y | Y | Y | Y |
| 1" | N | N | N | N | N | N | N | N | N | N | Y | Y | Y | Y | Y |
| 2" | | | | | | | | | | | Y | Y | Y | Y | Y |
| 3" | | | | | | | | | | | N | N | Y | Y | Y |
| 4" | | | | | | | | | | | N | N | Y | Y | Y |
| 5" | | | | | | | | | | | N | N | N | Y | Y |
| 6" | | | | | | | | | | | N | N | N | Y | Y |
| 7" | | | | | | | | | | | N | N | N | Y | Y |
| 8" | | | | | | | | | | | N | N | N | N | Y |
| 9" | | | | | | | | | | | N | N | N | N | Y |
| 10" | | | | | | | | | | | N | N | N | N | N |
| 11" | | | | | | | | | | | | | | | |
| 12" | | | | | | | | | | | | | | | |

Legend:
Y = text is readable
N = text is unreadable

As can be appreciated by referring to the results shown in TABLE 2, the FIG. 6 samples had far greater translucency than the FIG. 2 and FIG. 4 samples. At less than a 1" distance from the sheet 110, no text was discernable through the FIG. 2 or FIG. 4 samples. The FIG. 4 sample showed the worst optical properties of all, with the smallest font unreadable at a 0" distance.

Figure 13:
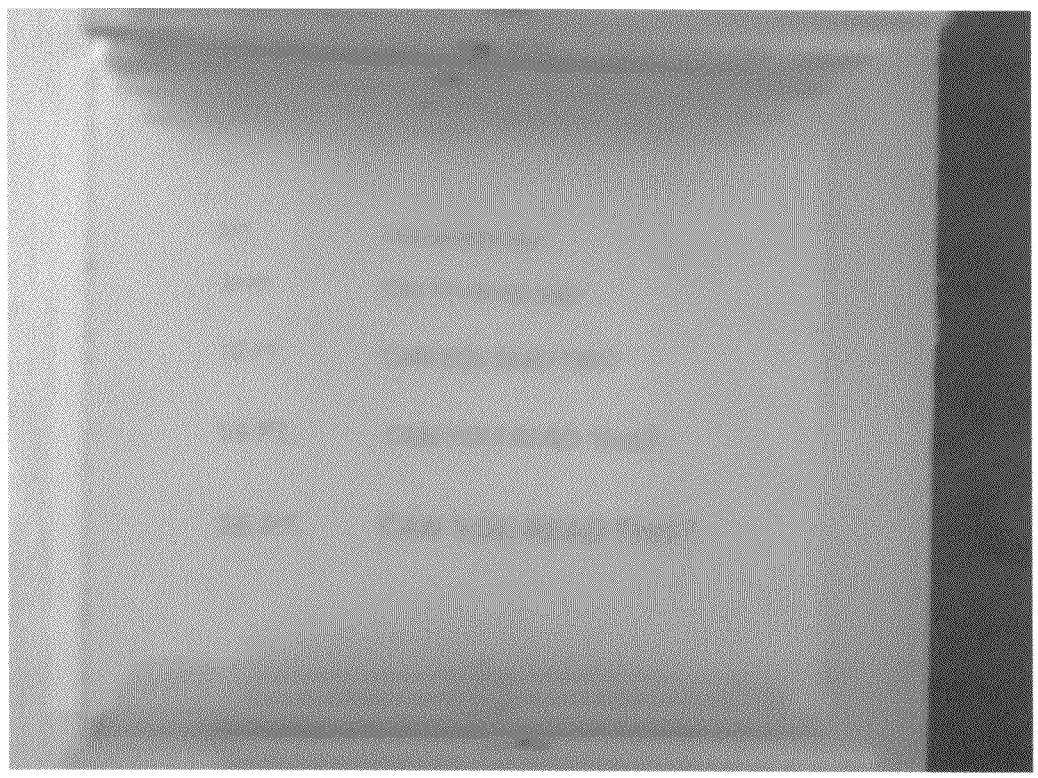
FIG. 13 is a photograph of one of the prior art translucent open-molded FRP samples of FIG. 2 shown in a first configuration within the test fixture of FIG. 12A.
Figure 14:
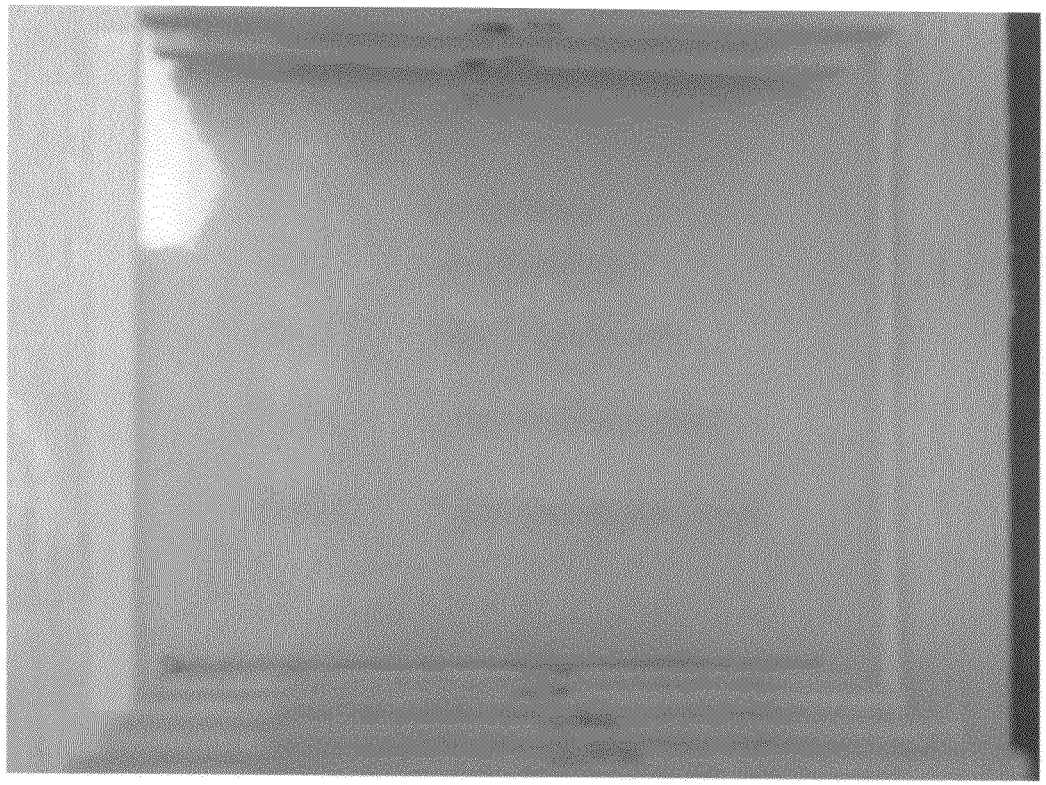
FIG. 14 is a photograph of the prior art sample of FIG. 13 shown in a second configuration within the test fixture of FIG. 12A.
Figure 15:
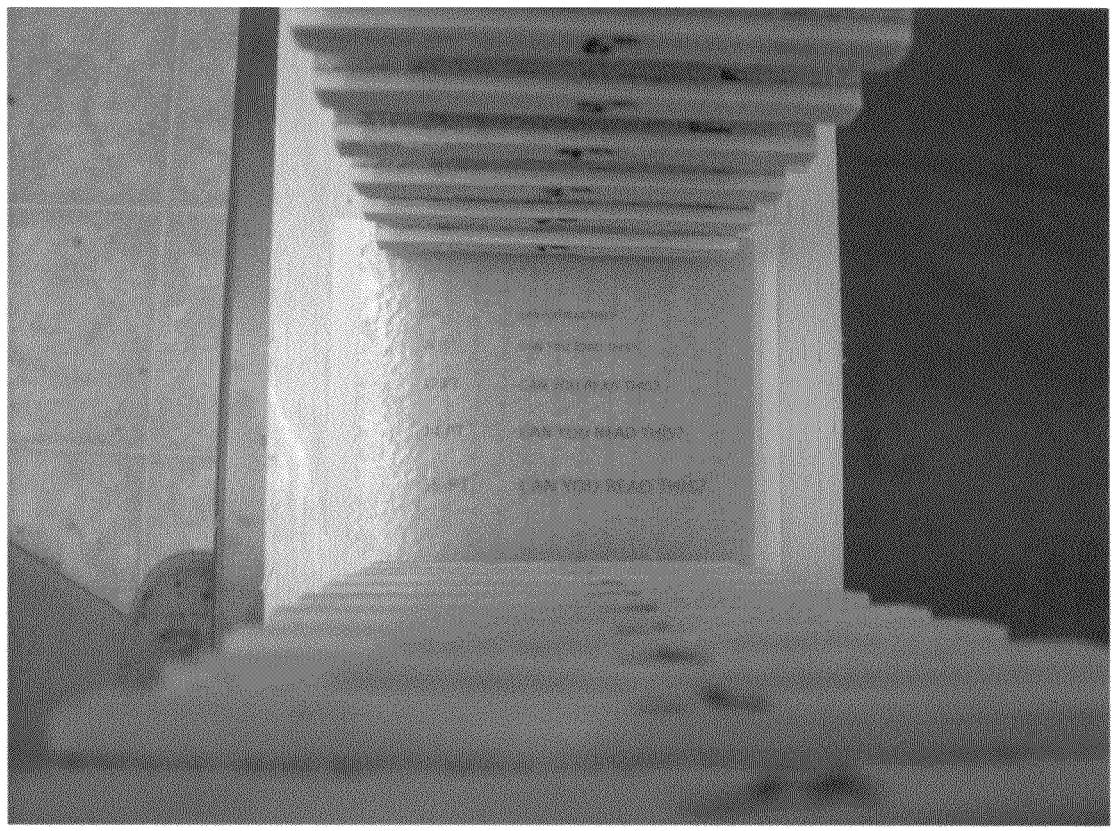
FIG. 15 is a photograph of one of the a low translucency closed-molded FRP samples of FIG. 4 shown in a first configuration within the test fixture of FIG. 12A.
Figure 16:
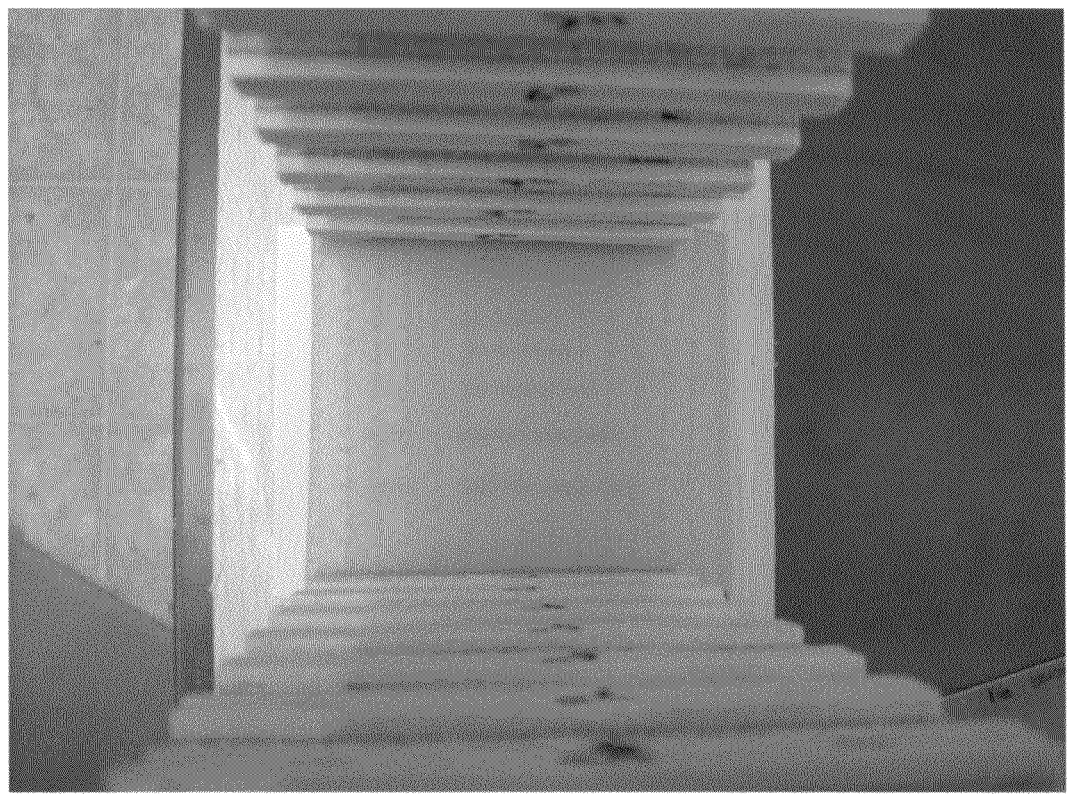
FIG. 16 is a photograph of the sample of FIG. 15 shown in a second configuration within the test fixture of FIG. 12A.

To illustrate the poor optical qualities of the FIG. 2 and FIG. 4 samples, a photograph of a FIG. 2 sample at a 0" distance from the sheet 110 (in other words, directly upon sheet 110) is shown in FIG. 13, where it can be seen that the text is somewhat readable, and a photograph of a FIG. 2 sample at a 1" distance from the sheet 110 is shown in FIG. 14, where it can be seen that the text is not readable. Similarly, a photograph of a FIG. 4 sample at a 0" distance from the sheet 110 (in other words, directly upon sheet 110) is shown in FIG. 15, where it can be seen that the text is somewhat readable, and a photograph of a FIG. 4 sample at a 1" distance from the sheet 110 is shown in FIG. 16, where it can be seen that the text is not readable.

Figure 17:
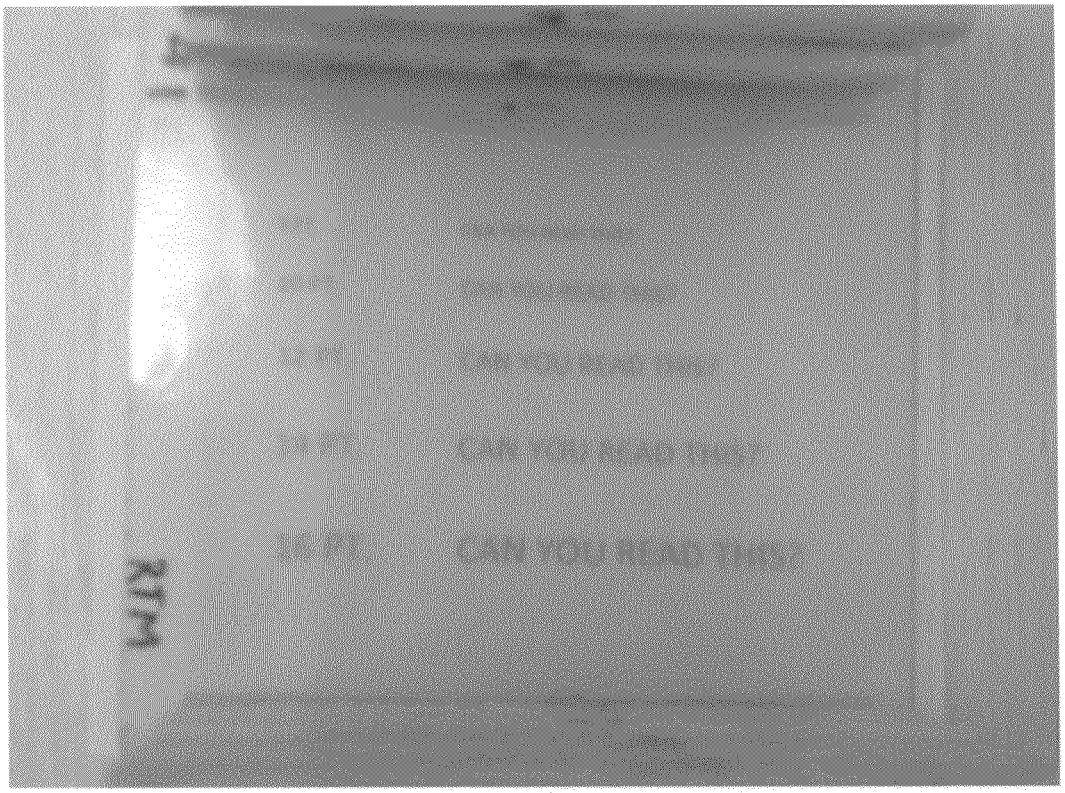
FIG. 17 is a photograph of one of the translucent closed-molded FRP samples of FIG. 6 shown in a first configuration within the test fixture of FIG. 12A.

In contrast, it can be seen by referring to the photograph of FIG. 17, which shows a FIG. 6 sample at a 4" distance from the sheet 110, that the text (at least down to a 12 point font size) is still readable through the sample. Thus, although this experiment is rather subjective, the experiment clearly demonstrates that the closed-molded RTM translucent FRP materials shown and described with respect to FIG. 6 have higher optical qualities and a higher degree of translucency than FRP materials formed also using substantially transparent resins, but in combination with other glass fiber pre-forms and made using different fabrication methods.

While illustrative embodiments have been illustrated and described, it will be appreciated that various changes can be made therein without departing from the spirit and scope of the present disclosure.

The invention claimed is:

1. A closed-molded translucent fiber-reinforced plastic (FRP) material, comprising:
   (a) first and second layers of a cured substantially clear gelcoat;
   (b) an FRP layer formed between the first and second layers of gelcoat, the FRP layer comprising:
      (i) a glass fiber pre-form comprising glass fibers having a preselected refractive index; and
      (ii) a cured transparent resin bonded to the glass fibers of the pre-form, the cured resin having a refractive index when cured that is substantially similar to the refractive index of the glass fibers of the pre-form.

2. The closed-molded translucent FRP material of claim 1, wherein the refractive index of the glass fibers is between about 1.54 and 1.58.

3. The closed-molded translucent FRP material of claim 2, wherein the refractive index of the cured resin is between about 1.55 and 1.57.

4. The closed-molded translucent FRP material of claim 1, wherein the glass fiber pre-form does not include flow media, binders, or stitching.

5. The closed-molded translucent FRP material of claim 1, wherein the FRP layer is between about 30-50% glass fibers by weight.

6. The closed-molded translucent FRP material of claim 1, wherein the first and second layers of gel coat and the FRP layer define a cross-sectional thickness between about 3.75 mm and 4.25 mm.

7. The closed-molded translucent FRP material of claim 1, wherein the material is configured such that at least 70% of light from a light source directed at a sample of the material having a thickness in the range of about 3-5 mm is transmitted through the material.

8. The closed-molded translucent FRP material of claim 1, wherein when a light source is positioned about 150.4 mm from a sample of the material having a thickness in the range of about 3-5 mm, a light sensor positioned about 150.4 mm from the material and positioned opposite the light source detects at least 70% of the light from the light source passing through the material.

9. A waterslide flume segment, comprising:
   (a) first and second layers of a cured substantially clear gelcoat;
   (b) an FRP layer formed between the first and second layers of gelcoat, the FRP layer comprising:
      (i) a glass fiber pre-form comprising glass fibers having a preselected refractive index; and
      (ii) a cured transparent resin bonded to the glass fibers of the pre-form, the cured resin having a refractive index when cured that is substantially similar to the refractive index of the glass fibers of the pre-form.

10. The waterslide flume segment of claim 9, wherein the refractive index of the glass fibers is between about 1.54 and 1.58.

11. The waterslide flume segment of claim 9, wherein the refractive index of the cured resin is between about 1.55 and 1.57.

12. The waterslide flume segment of claim 9, wherein the glass fiber pre-form does not include flow media, binders, or stitching.

13. The waterslide flume segment of claim 9, wherein the FRP layer is between about 35-50% glass fibers by weight.

14. The waterslide flume segment of claim 9, wherein the first and second layers of gel coat and the FRP layer define a cross-sectional thickness between about 3.75 mm and 4.25 mm.

15. The waterslide flume segment of claim 14, wherein the material is configured such that at least 70% of light from a light source directed through the cross-sectional thickness of the material is transmitted through the material.

16. The waterslide flume segment of claim 14, wherein when a light source is positioned about 150.4 mm from the material, a light sensor positioned about 150.4 mm from the material and positioned opposite the light source detects at least 70% of the light from the light source passing through the material.

* * * * *